US010924299B2

(12) United States Patent
Liu

(10) Patent No.: US 10,924,299 B2
(45) Date of Patent: Feb. 16, 2021

(54) PACKET FORWARDING

(71) Applicant: NEW H3C TECHNOLOGIES CO., LTD., Hangzhou (CN)

(72) Inventor: Jianfeng Liu, Beijing (CN)

(73) Assignee: NEW H3C TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 16/318,118

(22) PCT Filed: Jul. 17, 2017

(86) PCT No.: PCT/CN2017/093100
§ 371 (c)(1),
(2) Date: Jan. 15, 2019

(87) PCT Pub. No.: WO2018/014803
PCT Pub. Date: Jan. 25, 2018

(65) Prior Publication Data
US 2019/0305985 A1 Oct. 3, 2019

(30) Foreign Application Priority Data

Jul. 20, 2016 (CN) .......................... 201610573471.0

(51) Int. Cl.
*H04L 12/46* (2006.01)
*H04L 12/28* (2006.01)
(Continued)

(52) U.S. Cl.
CPC ........ *H04L 12/4633* (2013.01); *H04L 12/287* (2013.01); *H04L 12/4625* (2013.01);
(Continued)

(58) Field of Classification Search
None
See application file for complete search history.

(56) References Cited

U.S. PATENT DOCUMENTS

2010/0067530 A1* 3/2010 Arai ...................... H04L 49/354
370/392
2010/0208593 A1 8/2010 Soon et al.
(Continued)

FOREIGN PATENT DOCUMENTS

CN      1725731 A      1/2006
CN    104243318 A     12/2014
(Continued)

OTHER PUBLICATIONS

ISA State Intellectual Property Office of the People's Republic of China, International Search Report Issued in Application No. PCT/CN2017/093100, dated Sep. 26, 2017, WIPO, 4 pages.
(Continued)

*Primary Examiner* — Yaotang Wang
(74) *Attorney, Agent, or Firm* — McCoy Russell LLP

(57) ABSTRACT

A first VXLAN tunnel is established between a gateway device and an aggregation switch which corresponds to a BRAS group including several BRAS network elements. A second VXLAN tunnel is established between the gateway device and each of the BRAS network elements. In an example, when receiving a first VXLAN packet from the aggregation switch through the first VXLAN tunnel, the gateway device may acquire a first user packet by de-encapsulating the first packet and forward an encapsulated first user packet to the BRAS network element through the second VXLAN tunnel by VXLAN encapsulating the first user packet. In turn, the gateway device may receive a second VXLAN packet from the BRAS network element through the second VXLAN tunnel and forward a corresponding encapsulated second user packet to the aggregation switch through the first VXLAN tunnel.

12 Claims, 4 Drawing Sheets

(51) Int. Cl.
*H04L 12/721* (2013.01)
*H04L 29/12* (2006.01)

(52) U.S. Cl.
CPC .......... *H04L 45/66* (2013.01); *H04L 61/2592* (2013.01); *H04L 2012/4629* (2013.01)

(56) References Cited

U.S. PATENT DOCUMENTS

| | | | |
|---|---|---|---|
| 2013/0318219 A1* | 11/2013 | Kancherla | H04L 49/70 709/222 |
| 2015/0009992 A1 | 1/2015 | Zhang | |
| 2015/0358232 A1 | 12/2015 | Chen et al. | |
| 2017/0163569 A1* | 6/2017 | Koganti | H04L 49/25 |

FOREIGN PATENT DOCUMENTS

| | | |
|---|---|---|
| CN | 104350714 A | 2/2015 |
| CN | 105591834 A | 5/2016 |
| CN | 105763385 A | 7/2016 |
| CN | 105763416 A | 7/2016 |
| CN | 107317768 A | 11/2017 |
| JP | 2015519822 A | 7/2015 |
| WO | 2014208538 A1 | 12/2014 |
| WO | 2016018410 A1 | 2/2016 |

OTHER PUBLICATIONS

ISA State Intellectual Property Office of the People's Republic of China, Written Opinion of the International Searching Authority Issued in Application No. PCT/CN2017/093100, dated Sep. 26, 2017, WIPO, 4 pages.

European Patent Office, Extended European Search Report Issued in Application No. 17830437.4, dated Apr. 12, 2019, Germany, 47 pages.

State Intellectual Property Office of the People's Republic of China, Office Action and Search Report Issued in Application No. 201610573471.0, dated Jun. 17, 2019, 12 pages. (Submitted with Partial Translation).

Japanese Patent Office, Office Action Issued in Application No. 2019-502732, dated Jan. 28, 2020, 5 pages. (Submitted with Machine Translation).

State Intellectual Property Office of the People's Republic of China, Office Action and Search Report Issued in Application No. 201610573471.0, dated Mar. 6, 2020, 8 pages. (Submitted with Machine Translation).

European Patent Office, Office Action Issued in Application No. 17830437.4, dated Mar. 19, 2020, Germany, 4 pages.

* cited by examiner

PACKET FORWARDING

CROSS REFERENCE TO RELATED APPLICATIONS

This present application is a U.S. National Phase of International Patent Application Serial No PCT/CN2017/093100 entitled "MESSAGE FORWARDING," filed on Jul. 17, 2017. International Patent Application Serial No. PCT/CN2017/093100 claims priority to Chinese Patent Application No. 201610573471.0 which is filed on Jul. 20, 2016. The entire contents of each of the above-cited applications are hereby incorporated by reference in their entirety for all purposes.

BACKGROUND

A Broadband Remote Access Server (BRAS) is an access gateway applied to a broadband network. The BRAS locates on an edge layer of a backbone network and may perform data access of an Internet Protocol (IP)/Asynchronous Transfer Mode (ATM) network within a user bandwidth to achieve broadband Internet access of commercial buildings and residential district.

In a Metropolitan Area Network (MAN) networking model, a BRAS is deployed in a MAN convergence room. A broadband user terminal is connected to an aggregation switch (HJSW) via an Optical Line Terminal (OLT), and then accesses to the BRAS via the HJSW.

DETAILED DESCRIPTION OF THE EMBODIMENTS

An exemplary example will be described in detail herein with reference to the accompanying drawings. When the following description refers to the accompanying drawings, the same numerals in the different drawings denote the same or similar elements unless otherwise indicated. The implementation described in the following exemplary examples is not representative of all examples consistent with the present disclosure. In contrast, they are merely examples of devices and methods consistent with some aspects of the present disclosure as detailed in the appended claims.

In the following examples of the present disclosure, a method of forwarding a packet, and a gateway device to which the method may be applied are provided.

In an example of this disclosure, a controller may maintain a resource pool containing a plurality of BRAS network elements, all of which are functionally equivalent and may be backed up for each other. The controller may group the BRAS network elements in the resource pool, and group at least two BRAS network elements into a same group. The BRAS network element may be either a physical BRAS device or virtual BRAS software (vBRAS) on a platform of an x86 server.

Figure 1:
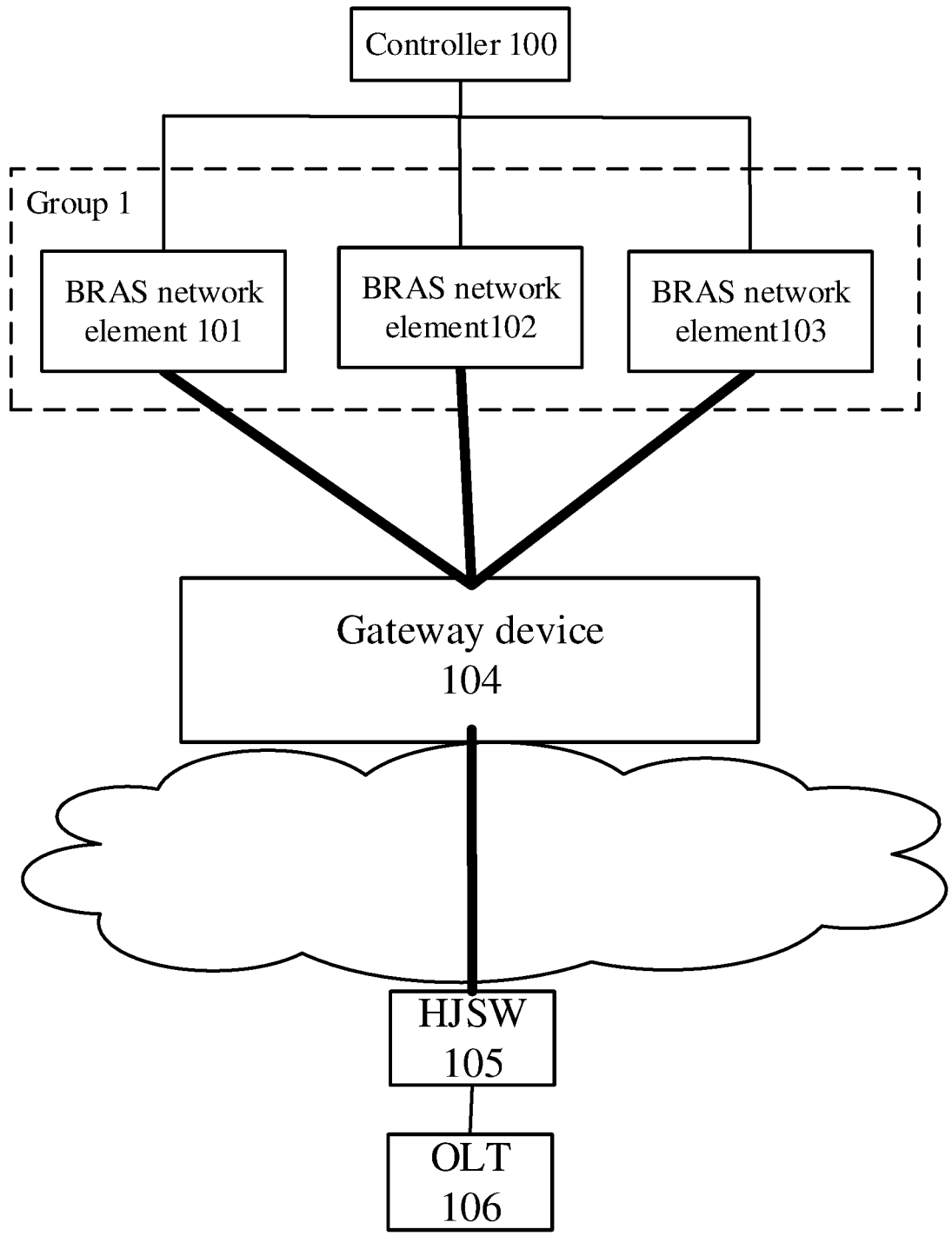
FIG. 1 is a schematic diagram of a networking architecture of a MAN according to an exemplary example of the present disclosure.

As shown in FIG. 1, a controller 100 groups BRAS network elements, where a group 1 includes BRAS network elements 101 to 103. The group 1 is designated by the controller 100 to an aggregation switch (HJSW) 105. In an example of the present disclosure, a gateway device 104 is added between the aggregation switch (HJSW) 105 and its corresponding BRAS network elements 101 to 103, and the gateway device 104 may be a switch or a router or the like. A Virtual eXtensible LAN (VXLAN) tunnel may be established between the aggregation switch 105 and the gateway device 104. A VXLAN tunnel may be established between the gateway device 104 and each of the BRAS network elements 101 to 103. A user terminal is accessed to the aggregation switch 105 via an OLT 106. A QinQ (Double-Layer label) tunnel may be established between the OLT 106 and the aggregation switch 105.

To establish a VXLAN tunnel, the following configuration may be performed.

A VXLAN tunnel may be configured on the aggregation switch 105, wherein a source IP address of the VXLAN tunnel is specified as an IP address of the aggregation switch 105 and its destination IP address is specified as an IP address of the gateway device 104. A VSI may be created on the aggregation switch 105, and a VXLAN may be created within the VSI. An Access Circuit (AC) interface, the VSI, and the VXLAN tunnel may be associated. Thus, the AC interface, the VSI, the VXLAN tunnel, and the VXLAN may form a corresponding relationship on the aggregation switch 105.

A VXLAN tunnel may be configured on the gateway device 104 for the aggregation switch 105, and the VXLAN tunnel is referred to as a first VXLAN tunnel. A source IP address of the first VXLAN tunnel is an IP address of the gateway device 104, and its destination IP address is an IP address of the aggregation switch 105. For each of the BRAS network elements in the group 1, a VXLAN tunnel may also configured on the gateway device 104, and the VXLAN tunnel is referred to as a second VXLAN tunnel. The source IP address of the second VXLAN tunnel is the IP address of the gateway device 104, and its destination IP address is the IP address of the BRAS network element. A VSI is created on the gateway device 104, and a VXLAN is created within the VSI. The VSI, all of the configured second VXLAN tunnels, and the configured first VXLAN tunnel may be associated. Thus, the VSI, second VXLAN tunnels, first VXLAN tunnel, and the VXLAN may form a corresponding relationship on the gateway device.

A VXLAN tunnel is configured on each BRAS network element in the group 1, wherein the source IP address of the VXLAN tunnel is specified as the IP address of the BRAS network element and its destination IP address is specified as the IP address of the gateway device 104. A VSI may be created on the BRAS network element, and a VXLAN may be created within the VSI. The VSI and the VXLAN tunnel are associated. Thus, the VSI, the VXLAN tunnel, and the VXLAN may form a corresponding relationship on each BRAS network element in the group 1.

Through the above configuration process, the controller 100 establishes a VXLAN tunnel between the aggregation switch 105 and the gateway device 104; and establishes a VXLAN tunnel between the gateway device 104 and each of the BRAS network elements in the group 1 to create a set of VXLAN tunnels. After the configuration is completed, the user terminal may be accessed to the BRAS network element via the aggregation switch 105.

In the uplink direction of a user terminal to a BRAS network element, the MAC address learning and packet forwarding process are as follows.

The user terminal issues a unicast user packet.

When receiving the unicast user packet through the AC interface, the aggregation switch 105 determines a VXLAN of the unicast user packet. The aggregation switch 105 then may learn the source MAC address of the unicast user packet, for example, by adding a MAC entry containing a corresponding relationship of the source MAC address and the AC interface into a MAC address table corresponding to the VXLAN. The aggregation switch 105 searches the MAC address table for a corresponding VXLAN tunnel according to the destination MAC address of the unicast user packet. After performing VXLAN encapsulation for the unicast user packet according to the VXLAN tunnel, the aggregation switch 105 forwards a VXLAN packet obtained by the encapsulation to the gateway device 104.

When receiving the VXLAN packet through the first VXLAN tunnel, the gateway device 104 acquires the unicast user packet by de-encapsulating the VXLAN packet. The gateway device 104 determines the VXLAN to which the VXLAN packet belongs, and learns the source MAC address of the unicast user packet, for example, by adding a MAC entry containing a corresponding relationship of the source MAC address and the first VXLAN tunnel into a MAC address table corresponding to the VXLAN. The gateway device 104 searches the MAC address table for a corresponding second VXLAN tunnel according to the destination MAC address of the unicast user packet. And after performing VXLAN encapsulation for the unicast user packet, the gateway device 104 forwards a VXLAN packet obtained by the encapsulation to the BRAS network element through the second VXLAN tunnel.

When receiving the VXLAN packet, the BRAS network element acquires the unicast user packet by de-encapsulating the VXLAN packet, determines the VXLAN to which the VXLAN packet belongs, learns the source MAC address of the unicast user packet, for example, by adding a MAC entry containing a corresponding relationship of the source MAC address and the VXLAN tunnel through which the VXLAN packet is received into a MAC address table corresponding to the VXLAN. And the BRAS network element performs a corresponding processing for the unicast user packet. For example, if the unicast user packet is de-encapsulated to obtain a protocol packet, the protocol packet may be sent to a protocol stack, and if the unicast user packet is de-encapsulated to obtain a data packet, the data packet may be forwarded to a public network and so on.

In the downlink direction of a BRAS network element to a user terminal, the MAC address learning and the packet forwarding process are as follows.

To send a unicast user packet, the BRAS network element determines a VXLAN of the unicast user packet, and searches a MAC address table corresponding to the VXLAN for a corresponding VXLAN tunnel according to the destination MAC address of the unicast user packet. After performing VXLAN encapsulation for the unicast user packet, the BRAS network element forwards a VXLAN packet obtained by the encapsulation to the gateway device 104 through the VXLAN tunnel. The unicast user packet to be sent may be, for example, a unicast user packet generated by the BRAS network element itself or a unicast user packet received by the BRAS network element from the public network and so on. The destination MAC address of the unicast user packet may be a destination MAC address carried in the unicast user packet, or a MAC address corresponding to a destination IP address carried in the unicast user packet.

When receiving the VXLAN packet through the second VXLAN tunnel, the gateway device 104 acquires the unicast user packet by de-encapsulating the VXLAN packet, and determines the VXLAN to which the VXLAN packet belongs. Then the gateway device 104 learns the source MAC address of the unicast user packet, for example, by adding a MAC entry containing a corresponding relationship of the source MAC address and the second VXLAN tunnel into a MAC address table corresponding to the VXLAN. The gateway device 104 searches the MAC address table for a corresponding first VXLAN tunnel according to the destination MAC address of the unicast user packet. And after performing VXLAN encapsulation for the unicast user packet, the gateway device 104 sends a VXLAN packet obtained by the encapsulation to the aggregation switch 105 through the first VXLAN tunnel.

When receiving the VXLAN packet, the aggregation switch 105 acquires the unicast user packet by de-encapsulating the VXLAN packet, and determines the VXLAN of the unicast user packet. Then the aggregation switch 105 learns the source MAC address of the unicast user packet, for example, by adding a MAC entry containing a corresponding relationship of the source MAC address and the VXLAN tunnel through which the VXLAN packet is received into a MAC address table corresponding to the VXLAN. The aggregation switch 105 searches the MAC address table for a corresponding AC interface according to the destination MAC address of the unicast user packet, and forwards the unicast user packet to a user terminal through the AC interface.

Through the above processing flow, the gateway device 104 not only needs to learn the MAC address of the user terminal, but also needs to learn the MAC address of the BRAS network element, which may lead to the shortage of MAC entry resource. To solve the problem, in the example of the present disclosure, the MAC address learning of the gateway device 104 has been improved, and accordingly the processing flow for forwarding a packet on the gateway device 104 may be improved.

First, a first VXLAN tunnel and second VXLAN tunnels corresponding to a same VXLAN are grouped on the gateway device 104. For example, the first VXLAN tunnel is grouped into a group, referred to as a first tunnel group, and the second VXLAN tunnels are grouped into another group, referred to as a second tunnel group. The specific grouping manner may be as follows.

When configuring the first VXLAN tunnel on the gateway device 104, the controller 100 specifies that the attribute of the first VXLAN tunnel is a first attribute. When configuring the second VXLAN tunnel on the gateway device 104, the controller 100 specifies that the attribute of the second VXLAN tunnel is a second attribute. Therefore, the first VXLAN tunnel corresponding to the first attribute of the same VXLAN forms the first tunnel group, and the second VXLAN tunnels of the second attribute form the second tunnel group. In an example, the first tunnel group and the second tunnel group are created in a way that the first VXLAN tunnel is added to the first tunnel group and the second VXLAN tunnel is added to the second tunnel group. Obviously, other grouping manners may also be used, and the example of the present disclosure is not limited thereto.

Based on the above grouping manner, in the uplink direction of a user terminal to a BRAS network element, the MAC address learning and the packet forwarding process are as follows.

The user terminal issues a unicast user packet.

When the unicast user packet is received, the MAC address learning and the packet forwarding process on the aggregation switch 105 are not changed, and therefore, the unicast user packet is encapsulated into a VXLAN packet and is sent to the gateway device 104.

Figure 2:
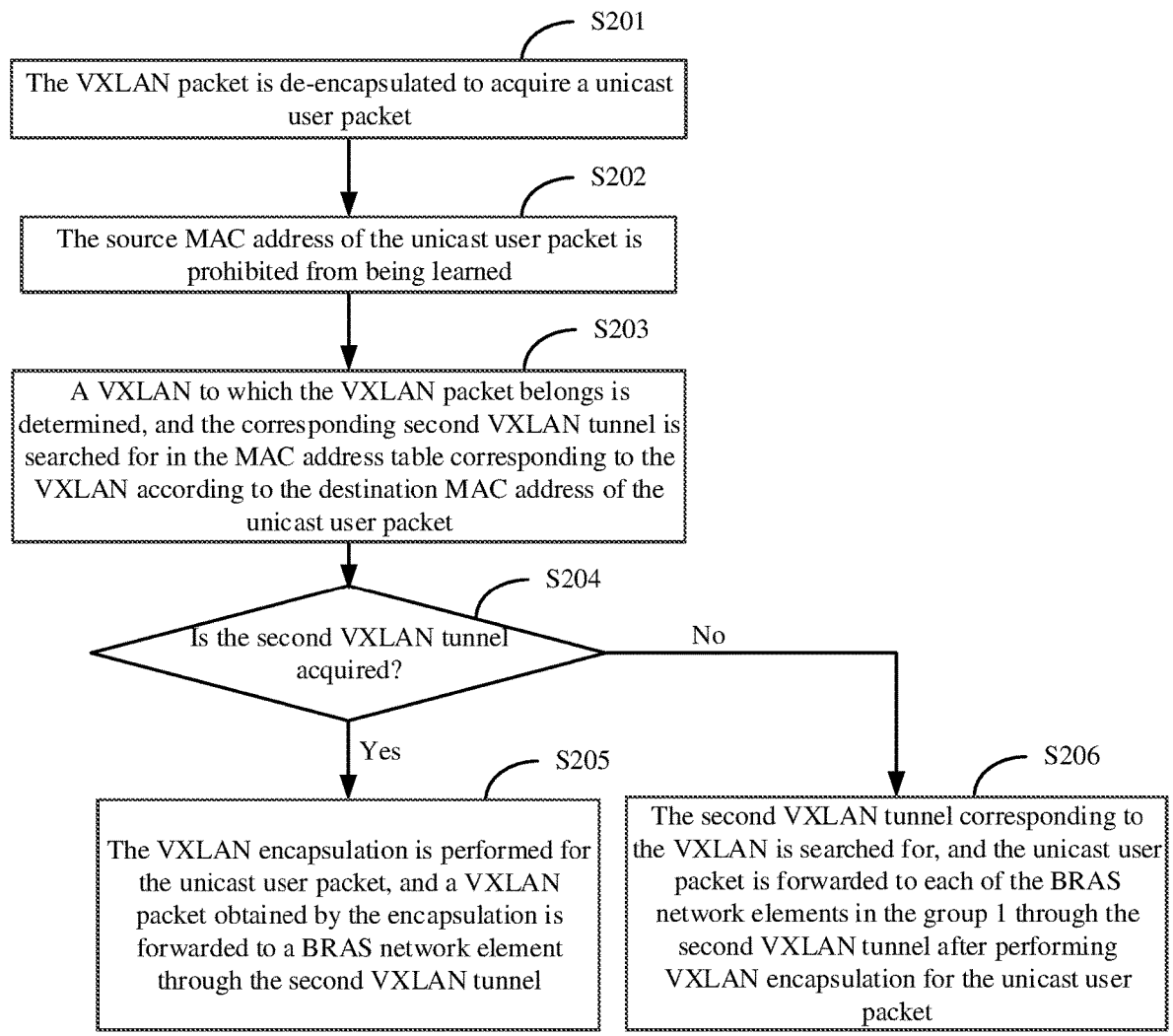
FIG. 2 is a flowchart illustrating a process performed by a gateway device after receiving a virtual extensible local area network (VXLAN) packet through a first VXLAN tunnel according to an exemplary example of the present disclosure.

As shown in FIG. 2, when receiving the VXLAN packet through the first VXLAN tunnel, the gateway device 104 may execute the following blocks.

At Block 5201: The VXLAN packet is de-encapsulated to acquire a unicast user packet.

At Block 5202: The source MAC address of the unicast user packet is prohibited from being learned.

That is, the gateway device 104 may not learn the MAC address of a user terminal.

At Block 5203: A VXLAN to which the VXLAN packet belongs is determined, and a corresponding second VXLAN tunnel is searched for in a MAC address table corresponding to the VXLAN according to the destination MAC address of the unicast user packet.

At Block 5204: It is determined whether the corresponding second VXLAN tunnel is acquired. If so, the Block 5205 is executed, otherwise, the Block 5206 is executed.

At Block 5205: The VXLAN encapsulation is performed for the unicast user packet, and a VXLAN packet obtained by the encapsulation is forwarded to a BRAS network element through the second VXLAN tunnel.

At Block 5206: The second VXLAN tunnel corresponding to the VXLAN is searched for, and the unicast user packet is forwarded to each of the BRAS network elements in the group 1 through the second VXLAN tunnel after performing VXLAN encapsulation for the unicast user packet.

In the Block 5206, it may be determined that the first VXLAN tunnel through which the VXLAN packet is received belongs to the first tunnel group according to a VXLAN ID in a VXLAN header of the VXLAN packet, and the source IP address and the destination IP address in an IP header of an outer layer. Thus each of second VXLAN tunnels in the second tunnel group corresponding to the determined first tunnel group may be determined as the second VXLAN tunnel corresponding to the VXLAN to which the VXLAN packet belongs. After the VXLAN encapsulation is performed for the unicast user packet according to each of the determined second VXLAN tunnels, a VXLAN packet obtained by the encapsulation is forwarded to a BRAS network element through the second VXLAN tunnel. Thus, the VXLAN packet may be broadcast to all of the BRAS network elements in the group 1.

Similarly, when the de-encapsulation in the Block 5201 acquires a broadcast user packet, the forwarding process of the Block 5206 will be also performed so that the acquired user packet may be broadcast to all of the BRAS network elements in the group 1.

The MAC address learning and the packet forwarding process on the BRAS network element are not changed when the VXLAN packet is received.

In the downlink direction of a BRAS network element to a user terminal, the MAC address learning and the packet forwarding process are as follows.

To send a unicast user packet, after performing VXLAN encapsulation for the unicast user packet, the BRAS network element sends a VXLAN packet obtained by the encapsulation to the gateway device 104.

Figure 3:
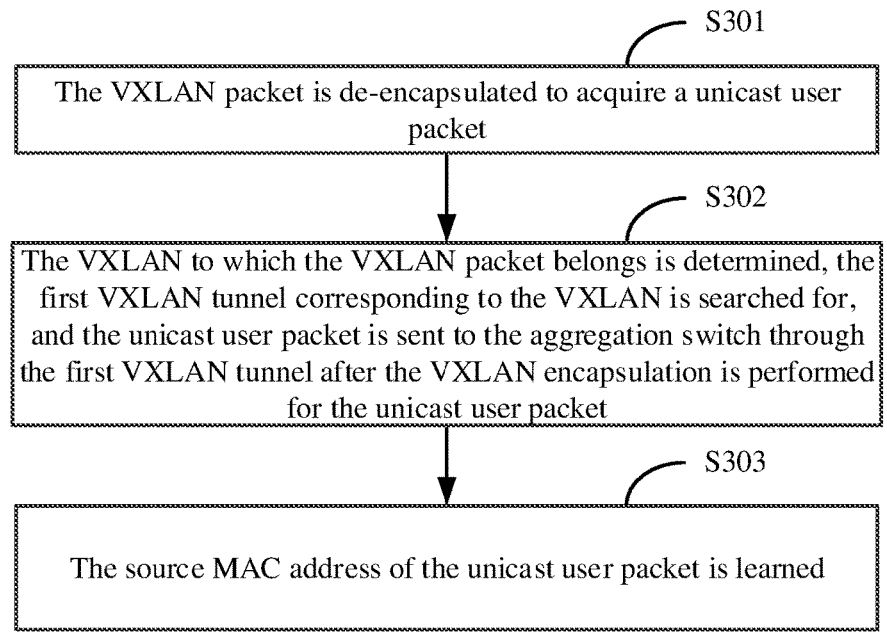
FIG. 3 is a flowchart illustrating a process performed by a gateway device after receiving a VXLAN packet through a second VXLAN tunnel according to an exemplary example of the present disclosure.

As shown in FIG. 3, the gateway device 104 may perform the following blocks after receiving the VXLAN packet through the second VXLAN tunnel.

At Block 5301: The VXLAN packet is de-encapsulated to acquire a unicast user packet.

At Block 5302: The VXLAN to which the VXLAN packet belongs is determined, a first VXLAN tunnel corresponding to the VXLAN is searched for, and the unicast user packet is sent to the aggregation switch 105 through the first VXLAN tunnel after performing the VXLAN encapsulation for the unicast user packet.

Specifically, in the Block 5302, it may be determined that the second VXLAN tunnel through which the VXLAN packet is received belongs to the second tunnel group according to the VXLAN ID in the VXLAN header of the VXLAN packet, and the source IP address and the destination IP address in the IP header of the outer layer. Thus the first VXLAN tunnel in the first tunnel group corresponding to the determined second tunnel group may be determined as the first VXLAN tunnel corresponding to the VXLAN to which the VXLAN packet belongs. Since the first tunnel group only includes one first VXLAN tunnel, after the VXLAN encapsulation is performed for the unicast user packet, a VXLAN packet obtained by the encapsulation is forwarded to the aggregation switch 105 through the first VXLAN tunnel.

At Block 5303: The source MAC address of the unicast user packet is learned, for example, by adding a MAC entry containing a corresponding relationship of the source MAC address and the second VXLAN tunnel into a MAC address table corresponding to the VXLAN.

Similarly, when the de-encapsulation in the Block 5301 acquires a broadcast user packet, the forwarding process of the Block 5302 is also executed so that the broadcast user packet is forwarded to the aggregation switch 105.

The MAC address learning and the packet forwarding process on the aggregation switch 105 are not changed when the VXLAN packet is received, and therefore, a unicast user packet obtained by the de-encapsulation is finally forwarded to the user terminal through an AC interface.

In the method of the above example of the present disclosure, the gateway device 104 is added between the aggregation switch 105 and at least one BRAS network elements corresponding to the aggregation switch 105. A VXLAN tunnel is established between the gateway device 104 and the aggregation switch 105, and a VXLAN tunnel is established between the gateway device 104 and each of the at least one BRAS network elements. The gateway device 104 de-encapsulates a first VXLAN packet to acquire a first user packet when receiving the first VXLAN packet from the aggregation switch 105 through a VXLAN tunnel. The gateway device 104 forwards the first user packet to the BRAS network element through a VXLAN tunnel after performing VXLAN encapsulation for the first user packet. The gateway device 104 de-encapsulates a second VXLAN packet to acquire a second user packet when receiving the second VXLAN packet from the BRAS network element through a VXLAN tunnel. The gateway device 104 forwards the second user packet to the aggregation switch 105 through a VXLAN tunnel after performing VXLAN encapsulation for the second user packet. Thus, the packet interaction between the BRAS network element and the user terminal can be realized.

The VXLAN tunnel between the aggregation switch 105 and each of the at least one BRAS network elements is segmented by the gateway device 104 into the VXLAN tunnel between the aggregation switch 105 and the gateway device 104 and the VXLAN tunnel between the gateway device 104 and each of the at least one BRAS network elements. Therefore, when the number of the at least one BRAS network elements varies, for example, increases or decreases, it may be possible that only the relevant configuration of the VXLAN tunnel on the gateway device 104 is modified so as to reduce the load of modifying the aggregation switch.

In addition, when receiving a user packet from the aggregation switch 105 through a VXLAN tunnel, the gateway device 104 does not need to learn the source MAC address of the user packet, that is, without needing to learn the MAC address of the user terminal. As the number of user terminals is relatively large, the number of the MAC addresses that the gateway device 104 needs to learn may be effectively reduced, thereby saving the MAC entry resources of the gateway device 104.

The gateway device 104 does not need to learn the MAC address of the user terminal. When receiving a user packet from the BRAS network element through the VXLAN tunnel, the gateway device 104 will forward the user packet to the aggregation switch 105 through the VXLAN tunnel between the device and the aggregation switch 105 corresponding to the VXLAN of the user packet. Since the VXLAN only corresponds to one VXLAN tunnel between the device and the aggregation switch 105, a flooding process for packets will not occur.

The method of the above example will be described in detail with reference to the actual network shown in FIG. 1. In the metropolitan area network shown in FIG. 1, the gateway device 104 connects the aggregation switch HJSW 105 and the BRAS network element 101 to 103. The BRAS network elements 101 to 103 are grouped into the same group, referred to as group 1. A user terminal 1 (not shown in FIG. 1) is connected to an AC interface AC1 of the HJSW 105 through an OLT 106.

The controller 100 configures a VXLAN tunnel Tunnel1 on the HJSW 105, specifies that the source IP address of the Tunnel1 is the IP address HJSW 105-IP of the HJSW 105 and its destination IP address is the IP address GW-IP of the gateway device 104, configures a VSI A, creates a VXLAN1 in the VSI A, and associates the AC1, the VSI A, and the Tunnel1.

The controller 100 configures the first VXLAN tunnel Tunnel1 for the HJSW 105 on the gateway device 104, specifies that the source IP address of the Tunnel1 is GW-IP and its destination IP address is HJSW 105-IP. The controller 100 configures the second VXLAN tunnels Tunnel2, Tunnel3, and Tunnel4 for each of the BRAS network element 101 to the BRAS network element 103, respectively. The controller 100 specifies that the source IP addresses of the Tunnel2, Tunnel3, and Tunnel4 are GW-IP, and their destination IP addresses are the IP address BRAS 101-IP of the BRAS network element 1, the IP address BRAS 102-IP of the BRAS network element 2, and the IP address BRAS 103-IP of the BRAS network element 3, respectively. The controller 100 configures a VSI A, creates a VXLAN1 in the VSI A, and associates the VSI A, the Tunnel1, the Tunnel2, the Tunnel3, and the Tunnel4. The controller 100 groups the Tunnel1 into the first tunnel group, and groups the Tunnel2, the Tunnel3, and the Tunnel4 into the second tunnel group.

The controller 100 configures the VXLAN tunnel Tunnel2 on the BRAS network element 101, specifies that the source IP address of the Tunnel2 is BRAS 101-IP and its destination IP address is GW-IP, configures a VSI A, creates the VXLAN1 in the VSI A, and associates the VSI A and the Tunnel2. The controller 100 configures the VXLAN tunnel Tunnel3 on the BRAS network element 102, specifies that the source IP address of the Tunnel3 is BRAS 102-IP and its destination IP address is GW-IP, configures a VSI A, creates the VXLAN1 in the VSI A, and associates the VSI A and the Tunnel3. The controller 100 configures the VXLAN tunnel Tunnel4 on the BRAS network element 103, specifies that the source IP address of the Tunnel4 is BRAS 103-IP and its destination IP address is GW-IP, configures a VSI A, creates the VXLAN1 in the VSI A, and associates the VSI A and the Tunnel4.

In a Point-to-Point Protocol over Ethernet (PPPoE) application scenario, the MAC address of the BRAS network element 101 is BRAS 101-MAC, the MAC address of the BRAS network element 102 is BRAS 102-MAC, the MAC address of the BRAS network element 103 is BRAS 103-MAC, and the MAC address of a user terminal 1 is USER1. The processing flow in this scenario is as follows.

The user terminal 1 issues a first packet. The source MAC address of the first packet is USER1, and its destination MAC address is a broadcast MAC address. The HJSW 105 determines that the VXLAN of the first packet is VXLAN1 when receiving the first packet through the AC1, and adds the MAC entry containing a corresponding relationship between USER1 and AC1 into a MAC address table corresponding to the VXLAN1, as shown in line 2 of Table 1-1. The HJSW 105 determines that the VXLAN tunnel corresponding to the VXLAN1 is Tunnel1, performs VXLAN encapsulation for the first packet, and sends a VXLAN packet obtained by the encapsulation to the gateway device 104 through the Tunnel1.

TABLE 1-1

| MAC address | VSI/VXLAN ID | Egress interface |
|---|---|---|
| USER1 | VSI A/VXLAN1 | AC1 |

The gateway device 104 de-encapsulates the VXLAN packet to acquire the first packet when receiving the VXLAN packet through the Tunnel1, determines that the VXLAN to which the VXLAN packet belongs is the VXLAN1, and searches for the Tunnel2, Tunnel3 and Tunnel4 in the second tunnel group corresponding to the VXLAN1. For each of the acquired VXLAN tunnels, the gateway device 104 performs the VXLAN encapsulation for the first packet, and forwards a VXLAN packet obtained by the encapsulation to the corresponding BRAS network element through the VXLAN tunnel. Thus, the first packet may be broadcast to the BRAS network element 101, the BRAS network element 102, and the BRAS network element 103.

When receiving the VXLAN packet, the BRAS network element 101 de-encapsulates the packet to acquire the first packet, determines that the VXLAN to which the VXLAN packet belongs is the VXLAN1, adds the MAC entry containing the corresponding relationship between USER1 and the Tunnel2 through which the VXLAN packet is received into the MAC address table corresponding to the VXLAN1, as shown in line 2 of Table 2. And the BRAS network element 101 reports the first packet to the controller 100.

Similarly, the BRAS network element 102 and the BRAS network element 103 will also perform the above operations to add the MAC entry corresponding to USER1 and report the first packet to the controller 100.

TABLE 2

| MAC address | VSI/VXLAN ID | Egress interface |
|---|---|---|
| USER1 | VSI A/VXLAN1 | Tunnel2 |

When receiving the first packet reported by the BRAS network element 101, the BRAS network element 102, and the BRAS network element 103, the controller 100 selects the BRAS network element 101 with the smallest load to send a response notification thereto. After receiving the response notification, the BRAS network element 101 may generate a response packet for the first packet. The source MAC address of the response packet is BRAS 101-MAC and its destination MAC address is USER1. Then the BRAS network element 101 searches the MAC address table as shown in Table 2 for the corresponding Tunnel2 according to the USER1. The BRAS network element 101 performs the VXLAN encapsulation for the response packet, and sends a VXLAN packet obtained by the encapsulation to the gateway device 104 through the Tunnel2.

When receiving the VXLAN packet through the Tunnel2, the gateway device 104 de-encapsulates the packet to acquire the response packet, determines that the VXLAN to which the VXLAN packet belongs is the VXLAN1, adds the MAC entry containing the corresponding relationship between BRAS 101-MAC and the Tunnel2 into the MAC address table corresponding to the VXLAN1, as shown in line 2 of Table 3. And the gateway device 104 searches for the Tunnel1 in the first tunnel group corresponding to the VXLAN1, performs VXLAN encapsulation for the response packet, and forwards a VXLAN packet obtained by the encapsulation to the HJSW 105 through the Tunnel1.

TABLE 3

| MAC address | VSI/VXLAN ID | Egress interface |
|---|---|---|
| BRAS 101-MAC | VSI A/VXLAN1 | Tunnel2 |

When receiving the VXLAN packet, the HJSW 105 de-encapsulates the packet to acquire the response packet, determines that the VXLAN to which the VXLAN packet belongs is the VXLAN1, adds the MAC entry containing the corresponding relationship between BRAS 101-MAC and the Tunnel1 through which the VXLAN packet is received into the MAC address table corresponding to the VXLAN1, as shown in line 3 of Table 1-2. Therefore the Table 1-1 is updated to Table 1-2. Moreover, the HJSW 105 searches for the corresponding AC1 in the MAC address table as shown in Table 1-2 according to the destination MAC address USER1 of the response packet, and forwards the response packet to the user terminal 1 through the AC1.

TABLE 1-2

| MAC address | VSI/VXLAN ID | Egress interface |
|---|---|---|
| USER1 | VSI A/VXLAN1 | AC1 |
| BRAS 101-MAC | VSI A/VXLAN1 | Tunnel1 |

Hereinafter, the subsequent packet sent by the user terminal 1 is a unicast packet, referred to as a packet 2, the destination MAC address of the packet 2 is BRAS 101-MAC. The HJSW 105 searches for the corresponding Tunnel1 in the MAC address table as shown in Table 1-2 according to the destination MAC address BRAS 101-MAC of the packet 2, performs the VXLAN encapsulation for the packet 2, and forwards a VXLAN packet obtained by the encapsulation to the gateway device 104 through the Tunnel1.

When receiving the VXLAN packet through the Tunnel1, the gateway device 104 de-encapsulates the packet to acquire the packet 2, searches for the corresponding Tunnel2 in the MAC address table as shown in Table 3 according to the destination MAC address BRAS 101-MAC of the packet 2, performs the VXLAN encapsulation for the packet 2, and forwards a VXLAN packet obtained by the encapsulation to the BRAS network element 101 through the Tunnel2.

When receiving the VXLAN packet, the BRAS network element 101 de-encapsulates the packet to acquire the packet 2, and performs the corresponding processing for the packet 2.

When the BRAS network element 101 intends to send a packet 3 to the user terminal 1, the BRAS network element 101 searches for the corresponding Tunnel2 in the MAC address table as shown in Table 2 according to the destination MAC address USER1 of the packet 3, performs the VXLAN encapsulation for the packet 3, and forwards a VXLAN packet obtained by the encapsulation to the gateway device 104 through the Tunnel2.

When receiving the VXLAN packet through the Tunnel2, the gateway device 104 de-encapsulates the packet to acquire the packet 3, determines that the VXLAN to which the VXLAN packet belongs is the VXLAN1, searches for the Tunnel1 in the first tunnel group corresponding to the VXLAN1, performs the VXLAN encapsulation for the packet 3, and forwards a VXLAN packet obtained by the encapsulation to the HJSW 105 through the Tunnel1.

When receiving the VXLAN packet, the HJSW 105 de-encapsulates the packet to acquire the packet 3, searches for the corresponding AC1 in the MAC address table as shown in Table 1-2 according to the destination MAC address USER1 of the packet 3, and thus sends the packet 3 to the user terminal 1 through the AC1.

Corresponding to the example of the foregoing method of forwarding a packet, the present disclosure further provides an example of a gateway device to which the method of forwarding a packet is applied.

Figure 4:
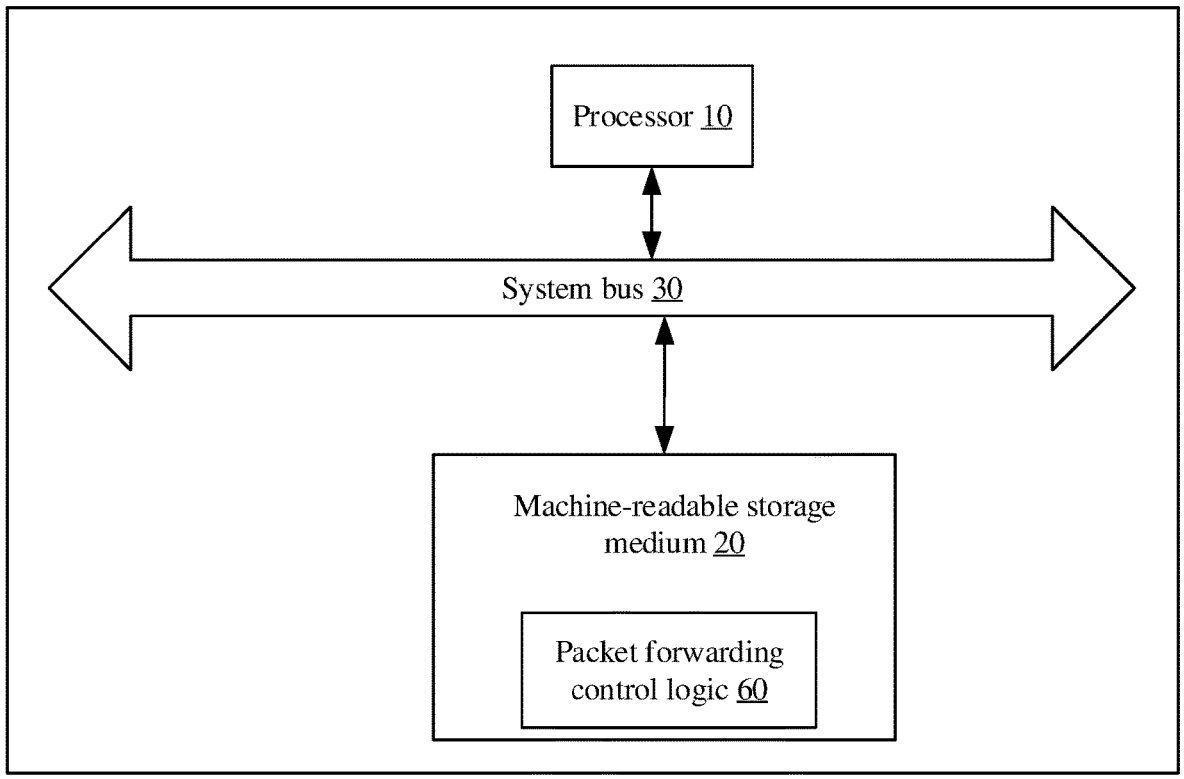
FIG. 4 schematically illustrates a hardware structure diagram of a gateway device according to an exemplary example of the present disclosure.

FIG. 4 schematically illustrates a hardware structure diagram of a gateway device provided according to an example of the present disclosure. The gateway device may include a processor 10, and a machine-readable storage medium 20 storing machine-executable instructions. The processor 10 and the machine-readable storage medium 20 may communicate with each other via a system bus 30. Moreover, the processor 10 may perform the method of forwarding a packet described above by reading and executing the machine-executable instructions corresponding to a packet forwarding control logic 60 in the machine-readable storage medium 20. In addition to the processor 10, the machine-readable storage medium 20 and the system bus 30 shown in FIG. 4, the gateway device may include other hardware depending on the actual functions of the gateway device, which will not be described again.

The machine-readable storage medium 20 referred to herein may be any electronic, magnetic, optical, or other physical storage devices to contain or store information such as executable instructions, data, etc. For example, the machine-readable storage medium may be: a Random Access Memory (RAM), a volatile memory, a non-volatile memory, a flash memory, storage drive (e.g., a hard disk drive), a solid state drive, any type of storage discs (e.g., a compact disc, a DVD, etc.), and the like, or a combination thereof.

Figure 5:
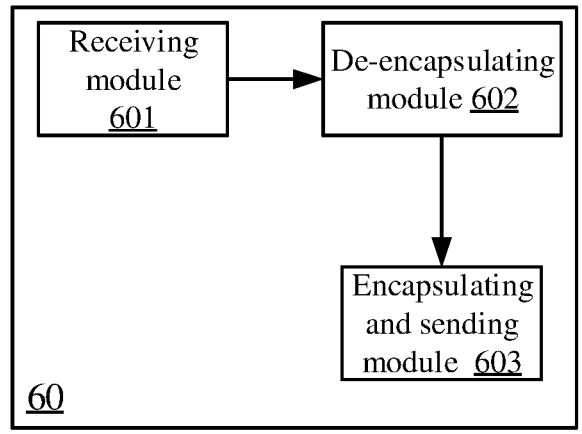
FIG. 5 is a structural schematic diagram of a gateway device according to an exemplary example of the present disclosure.

Referring to FIG. 5, functionally, the packet forwarding control logic 60 may include a receiving module 601, a de-encapsulating module 602, and an encapsulating and sending module 603.

Herein, the receiving module 601 is configured to receive a first VXLAN packet from an aggregation switch through a first VXLAN tunnel established between the gateway device and the aggregation switch and a second VXLAN packet from a BRAS network element through a second VXLAN tunnel established between the gateway device and the BRAS network element.

The de-encapsulating module 602 is configured to de-encapsulate the first VXLAN packet to acquire a first user packet after the receiving module 601 receives the first VXLAN packet, and de-encapsulate the second VXLAN packet to acquire a second user packet after the receiving module 601 receives the second VXLAN packet.

The encapsulating and sending module 603 is configured to send the first user packet de-encapsulated by the de-encapsulating module 602 to the BRAS network element through the second VXLAN tunnel after performing VXLAN encapsulation for the first user packet, and forward the second user packet de-encapsulated by the de-encapsulating module 602 to the aggregation switch through the first VXLAN tunnel after performing VXLAN encapsulation for the second user packet.

Figure 6:
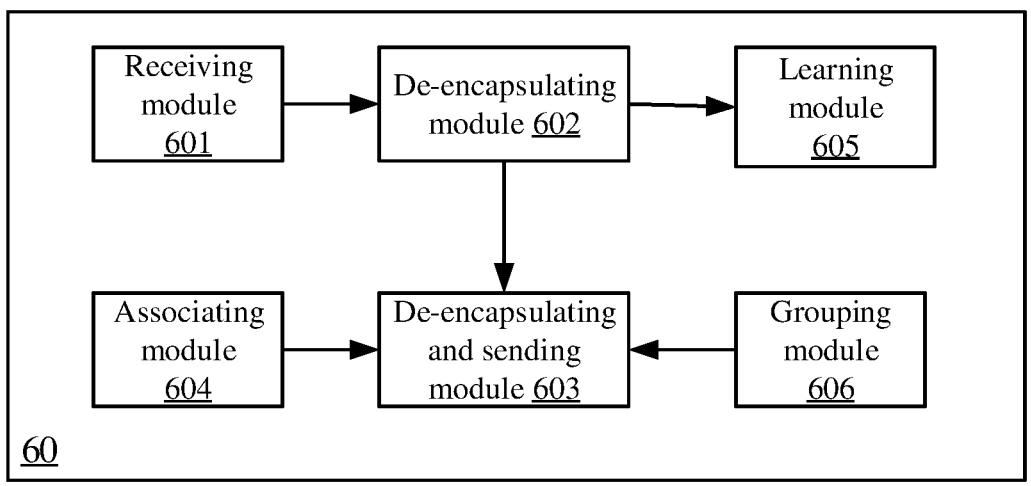
FIG. 6 is another structural schematic diagram of a gateway device according to an exemplary example of the present disclosure.

As shown in FIG. 6, the packet forwarding control logic 60 described above includes an associating module 604 and a grouping module 606. The associating module 604 is configured to associate the first VXLAN tunnel and a plurality of the second VXLAN tunnels with the same VXLAN. The grouping module 606 is configured to group the first VXLAN tunnel into the first tunnel group, and group a plurality of the second VXLAN tunnels into the second tunnel group.

As shown in FIG. 6, the packet forwarding control logic 60 described above further includes a learning module 605 configured to prohibit from learning a source MAC address of the first user packet after the de-encapsulating module 602 de-encapsulates the first VXLAN packet to acquire the first user packet.

Herein, the encapsulating and sending module 602 performs VXLAN encapsulation for the first user packet by the following blocks: determining a VXLAN of the first VXLAN packet, and acquiring at least one second VXLAN tunnels corresponding to the VXLAN and performing VXLAN encapsulation for the first user packet according to each of the acquired second VXLAN tunnels, when the first user packet is an unknown unicast packet or a broadcast packet.

The encapsulating and sending module 602 performs VXLAN encapsulation for the second user packet by the following blocks: determining a VXLAN of the second VXLAN packet, acquiring the first VXLAN tunnel corresponding to the VXLAN, and performing VXLAN encapsulation for the second user packet according to the acquired first VXLAN tunnel.

Herein, the encapsulating and sending module 602 acquires the second VXLAN tunnels corresponding to the VXLAN by the following blocks: determining the first tunnel group to which the first VXLAN tunnel through which the first VXLAN packet is received belongs, and determining each of the second VXLAN tunnels in the second tunnel group corresponding to the determined first tunnel group as the second VXLAN tunnels corresponding to the VXLAN of the first VXLAN packet.

The encapsulating and sending module 602 acquires the first VXLAN tunnel corresponding to the VXLAN by the following blocks: determining the second tunnel group to which the second VXLAN tunnel through which the second VXLAN packet is received belongs, and determining the first VXLAN tunnel in the first tunnel group corresponding to the determined second tunnel group as the first VXLAN tunnel corresponding to the VXLAN of the second VXLAN packet.

The implementation of the functions and effects of the respective units in the above device is described in detail in the implementation of the corresponding blocks in the above method, which will not be described again.

For the device example, since it corresponds substantially to the method example, reference is made to the partial description of the method example for the related part. The device example described above is merely illustrative, where the unit described as a separating component may or may not be physically separate, and the component shown as a unit may or may not be a physical unit, which may be located in one place or may be distributed to a plurality of network units. A part or all of the modules may be selected according to the actual needs to achieve the object of the solution of the present disclosure. One of ordinary skill in the art will understand and practice without paying creative work.

The terminology used in the present disclosure is for the purpose of describing particular examples only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word such as "if" used herein may be interpreted as "when" or "as" or "determining in response to".

The foregoing is intended only as a preferred example of the present disclosure and is not intended to be limiting of the present disclosure, and any modifications, equivalent substitutions, improvements, etc., which are made within the spirit and principles of the present disclosure, should fall within the scope of protection of the present disclosure.

The invention claimed is:

1. A method of forwarding a packet, a first Virtual eXtensible Local Area Network (VXLAN) tunnel is established between a gateway device and an aggregation switch, the aggregation switch corresponds to a Broadband Remote Access Server (BRAS) group including a plurality of BRAS network elements, and a second VXLAN tunnel is established between the gateway device and each of the BRAS network elements in the BRAS group, wherein the method comprises:

receiving, by the gateway device, a first VXLAN packet from the aggregation switch through the first VXLAN tunnel;

acquiring, by the gateway device, a first user packet by de-encapsulating the first VXLAN packet;

performing, by the gateway device, a VXLAN encapsulation for the first user packet;

forwarding, by the gateway device, the encapsulated first user packet to the BRAS network element through the second VXLAN tunnel;

receiving, by the gateway device, a second VXLAN packet from the BRAS network element through the second VXLAN tunnel;

acquiring, by the gateway device, a second user packet by de-encapsulating the second VXLAN packet; and performing, by the gateway device, a VXLAN encapsulation for the second user packet; and forwarding, by the gateway device, the encapsulated second user packet to the aggregation switch through the first VXLAN tunnel;

wherein the first VXLAN tunnel belongs to a first tunnel group, and the plurality of second VXLAN tunnels belong to a second tunnel group corresponding to the first tunnel group, wherein correspondence between the first tunnel group and the second tunnel group is preconfigured before the first VXLAN packet is received, and wherein a source Media Access Control (MAC) address of the first user packet is prohibited from being learned.

2. The method according to claim 1, wherein the first VXLAN tunnel and a plurality of the second VXLAN tunnels are associated with a same VXLAN.

3. The method according to claim 1, wherein the gateway device performs the VXLAN encapsulation for the first user packet, comprising:

determining, by the gateway device, a VXLAN to which the first VXLAN packet belongs when the first user packet is an unknown unicast packet or a broadcast packet, and acquiring, by the gateway device, the second VXLAN tunnels corresponding to the determined VXLAN; and performing, by the gateway device, the VXLAN encapsulation for the first user packet according to each of the acquired second VXLAN tunnels.

4. The method according to claim 3, wherein acquiring the second VXLAN tunnels corresponding to the determined VXLAN, comprises:

determining, by the gateway device, the first VXLAN tunnel through which the first VXLAN packet is received, determining, by the gateway device, the first tunnel group to which the determined first VXLAN tunnel belongs; and determining, by the gateway device, each of the second VXLAN tunnels in the second tunnel group corresponding to the determined first tunnel group as the second VXLAN tunnel corresponding to the determined VXLAN to which the first VXLAN packet belongs.

5. The method according to claim 1, wherein the gateway device performs the VXLAN encapsulation for the second user packet, comprising:

determining, by the gateway device, a VXLAN to which the second VXLAN packet belongs, acquiring, by the gateway device, the first VXLAN tunnel corresponding to the determined VXLAN; and performing, by the gateway device, the VXLAN encapsulation for the second user packet according to the acquired first VXLAN tunnel.

6. The method according to claim 5, wherein acquiring the first VXLAN tunnel corresponding to the determined VXLAN, comprises:

determining, by the gateway device, the second VXLAN tunnel through which the second VXLAN packet is received, determining, by the gateway device, the second tunnel group to which the determined second VXLAN tunnel belongs, and determining, by the gateway device, the first VXLAN tunnel in the first tunnel group corresponding to the determined second tunnel group as the first VXLAN tunnel corresponding to the determined VXLAN to which the second VXLAN packet belongs.

7. A gateway device, wherein a first Virtual eXtensible Local Area Network (VXLAN) tunnel is established between the gateway device and an aggregation switch, the aggregation switch corresponds to a Broadband Remote Access Server (BRAS) group including a plurality of BRAS network elements, and a second VXLAN tunnel is established between the gateway device and each of the BRAS network elements in the BRAS group, wherein the gateway device comprises:

a processor; and a machine-readable storage medium to store machine-executable instructions which are executable by the processor to:

receive a first VXLAN packet from the aggregation switch through the first VXLAN tunnel;

acquire a first user packet by de-encapsulating the first VXLAN packet;

perform a VXLAN encapsulation for the first user packet;

forward the encapsulated first user packet to the BRAS network element through the second VXLAN tunnel;

receive a second VXLAN packet from the BRAS network element through the second VXLAN tunnel;

acquire a second user packet by de-encapsulating the second VXLAN packet; and perform a VXLAN encapsulation for the second user packet; and forward the encapsulated second user packet to the aggregation switch through the first VXLAN tunnel, wherein the first VXLAN tunnel belongs to a first tunnel group, and the plurality of second VXLAN tunnels belong to a second tunnel group corresponding to the first tunnel group, wherein correspondence between the first tunnel group and the second tunnel group is preconfigured before the first VXLAN packet is received, and wherein a source Media Access Control (MAC) address of the first user packet is prohibited from being learned.

8. The gateway device according to claim 7, wherein the first VXLAN tunnel and a plurality of the second VXLAN tunnels are associated with a same VXLAN.

9. The gateway device according to claim 7, wherein when performing the VXLAN encapsulation for the first user packet, the processor is further caused by the machine-executable instructions to:
   determine a VXLAN to which the first VXLAN packet belongs when the first user packet is an unknown unicast packet or a broadcast packet, and acquire the second VXLAN tunnels corresponding to the determined VXLAN; and perform the VXLAN encapsulation for the first user packet according to each of the acquired second VXLAN tunnels.

10. The gateway device according to claim 9, wherein when acquiring the second VXLAN tunnels corresponding to the determined VXLAN, the processor is further caused by the machine-executable instructions to:
   determine the first VXLAN tunnel through which the first VXLAN packet is received, determine the first tunnel group to which the determined first VXLAN tunnel belongs; and determine each of the second VXLAN tunnels in the second tunnel group corresponding to the determined first tunnel group as the second VXLAN tunnel corresponding to the determined VXLAN to which the first VXLAN packet belongs.

11. The gateway device according to claim 7, wherein when performing the VXLAN encapsulation for the second user packet, the processor is further caused by the machine-executable instructions to:
   determine a VXLAN to which the second VXLAN packet belongs, acquire the first VXLAN tunnel corresponding to the determined VXLAN; and perform the VXLAN encapsulation for the second user packet according to the acquired first VXLAN tunnel.

12. The gateway device according to claim 11, wherein when acquiring the first VXLAN tunnel corresponding to the determined VXLAN, the processor is further caused by the machine-executable instructions to:
   determine the second VXLAN tunnel through which the second VXLAN packet is received, determine the second tunnel group to which the determined second VXLAN tunnel belongs, and determine the first VXLAN tunnel in the first tunnel group corresponding to the determined second tunnel group as the first VXLAN tunnel corresponding to the determined VXLAN to which the second VXLAN packet belongs.

* * * * *